US006859884B1

(12) United States Patent
Sullam

(10) Patent No.: US 6,859,884 B1
(45) Date of Patent: Feb. 22, 2005

(54) METHOD AND CIRCUIT FOR ALLOWING A MICROPROCESSOR TO CHANGE ITS OPERATING FREQUENCY ON-THE-FLY

(75) Inventor: Bert Sullam, Bellevue, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 685 days.

(21) Appl. No.: 09/826,397

(22) Filed: Apr. 2, 2001

Related U.S. Application Data

(60) Provisional application No. 60/243,708, filed on Oct. 26, 2000.

(51) Int. Cl.[7] .............................. G06F 1/26; G06F 1/04
(52) U.S. Cl. ....................... 713/322; 713/501; 713/600; 327/107
(58) Field of Search ................................ 713/322, 401, 713/501, 600, 300, 500; 327/100, 107; 375/373, 375, 376

(56) References Cited

U.S. PATENT DOCUMENTS

| | | | | |
|---|---|---|---|---|
| 5,202,687 A | | 4/1993 | Distinti ........................ 341/158 |
| 5,258,760 A | | 11/1993 | Moody et al. ................ 341/166 |
| 5,319,771 A | * | 6/1994 | Takeda ......................... 713/501 |
| 5,378,935 A | * | 1/1995 | Korhonen et al. ........... 327/114 |
| 5,414,308 A | | 5/1995 | Lee et al. ..................... 327/293 |
| 5,563,526 A | | 10/1996 | Hastings et al. ............... 326/37 |
| 5,572,719 A | * | 11/1996 | Biesterfeldt ................... 713/500 |
| 5,579,353 A | * | 11/1996 | Parmenter et al. ........... 375/376 |
| 5,600,262 A | | 2/1997 | Kolze ............................ 326/38 |
| 5,696,952 A | * | 12/1997 | Pontarelli .................... 713/600 |
| 5,774,704 A | * | 6/1998 | Williams ..................... 713/501 |
| 6,144,327 A | | 11/2000 | Distinti et al. ............... 341/126 |
| 6,166,367 A | | 12/2000 | Cho .......................... 250/208.1 |
| 6,225,866 B1 | | 5/2001 | Kubota et al. .............. 330/295 |
| 6,574,739 B1 | * | 6/2003 | Kung et al. ................. 713/322 |

OTHER PUBLICATIONS

CYPR–CD00175; "Method for Synchronizing and Resetting Clock Signals Supplied to Multiple Programmable Analog Blocks (as Ammended)"; Oct. 1, 2001; U.S Appl. No. 09/969,311: B. Sullam.

CYPR–CD00189; "System and Method of Providing a Programmable Clock Architecture for an Advanced Microcontroller"; Oct. 24, 2001; U.S. Appl. No. 10/000,383; Sullam et al.

* cited by examiner

Primary Examiner—Lynne H. Browne
Assistant Examiner—Thuan Du
(74) Attorney, Agent, or Firm—Wagner, Murabito & Hao LLP

(57) ABSTRACT

A circuit that permits a processor in a microcontroller to adjust its clock speed on the fly. A processor receives a current clock signal and a phased current clock signal from a speed selection switch. A new speed selection switch provides a new clock signal and a phased new clock signal for comparison with the current clock signals. When the states of the current and new clocks appropriately align after issuance of a control from the processor, the new speed is switched into the current speed switch to permit the clock speed to change without producing spurious signals that cause unpredictable action in the processor. This advantageously allows the microcontroller to adjust its clock speed under program control.

20 Claims, 4 Drawing Sheets

METHOD AND CIRCUIT FOR ALLOWING A MICROPROCESSOR TO CHANGE ITS OPERATING FREQUENCY ON-THE-FLY

CROSS REFERENCE TO RELATED DOCUMENTS

This application is related to and claims priority benefit of U.S. Provisional patent application Ser. No. 60/243,708, filed Oct. 26, 2000, entitled "Advanced Programmable Microcontroller Device" to Snyder, et al., which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of providing clocking signals to microprocessors. More particularly, this invention relates to an apparatus and method for a processor to change the processor clock speed in a microcontroller on the fly.

BACKGROUND OF THE INVENTION

Microcontrollers are utilized in increasing numbers to carry out a wide range of programmable operations. In some operations, perhaps especially those requiring minimum power consumption, it is desirable for the microcontroller to be able to change its own clock frequency. This is advantageous since reduced clock speed usually translates to lower power consumption. The clock can be increased in frequency when high computation power is required or when certain microcontroller circuitry must operate at a high speed, and the power can be reduced by reducing the clock speed at other times.

In order to effect a change in clock speed, a smooth speed transition should take place in order to avoid clock "glitches" that can result in processor malfunctions and even potentially lock up the circuitry. In addition, it is desirable that any circuitry provided for manipulation of the clock speed should be simple and occupy minimal die area in the finished microcontroller.

SUMMARY OF THE INVENTION

The present invention relates generally to clock circuits for integrated processors. Objects, advantages and features of the invention will become apparent to those skilled in the art upon consideration of the following detailed description of the invention.

In one embodiment consistent with the present invention, a circuit that permits a processor in a microcontroller to adjust its clock speed on the fly. A processor receives a current clock signal and a phased current clock signal from a speed selection switch. A new speed selection switch provides a new clock signal and a phased new clock signal for comparison with the current clock signals. When the states of the current and new clocks appropriately align after issuance of a control signal from the processor, the new speed is switched into the current speed switch to permit the clock speed to change without producing spurious signals that can cause unpredictable action in the processor. This advantageously allows the microcontroller to adjust its clock speed under program control.

In an embodiment consistent with the present invention, a circuit that allows a processor forming a part of a microcontroller to change its operating frequency includes a clock generator generating a plurality of clock signals at a plurality of frequencies. A first switch receives the plurality of clock signals and selects one of the clock signals as an output thereof to be the current clock according to a current speed select signal. A current speed latch stores the current speed select signal. A first phase shifter shifts the phase of the current clock to produce a phase shifted current clock. A second switch receives the plurality of clock signals and selects one of the clock signals as an output thereof to be the new clock according to a new speed select signal. A new speed register stores the new speed select signal. The new speed select signal is produced by the processor and stored in the new speed register. A second phase shifter shifts the phase of the new clock to produce a phase shifted new clock. A logic circuit receives the current clock, the phase shifted current clock, the new clock, the phase shifted new clock and a signal from the processor directing a speed change as inputs thereto for producing a signal latching the new speed into the current speed latch at a point in time after the speed change signal when the current clock, phase shifted current clock, the new clock and the phase shifted new clock have the same state.

A method for a processor forming a part of a microcontroller to change its clock frequency consistent with an embodiment of the present invention, includes at the processor, receiving a clock signal; determining that the clock frequency is to be changed under program control; storing a new clock frequency signal in a new speed register; issuing an I/O write command indicating that the clock frequency is to change; in a logic circuit, examining a current clock signal, a new clock signal, a phase shifted current clock signal and a phase shifted new clock signal; when the current clock signal, the new clock signal, the phase shifted current clock signal and the phase shifted new clock signal reach predetermined states, latching the new clock frequency signal into a current clock speed latch; and at a switch, receiving an output from the current clock speed latch and changing a switch setting in response thereto, the switch setting determining the speed of the clock signal.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
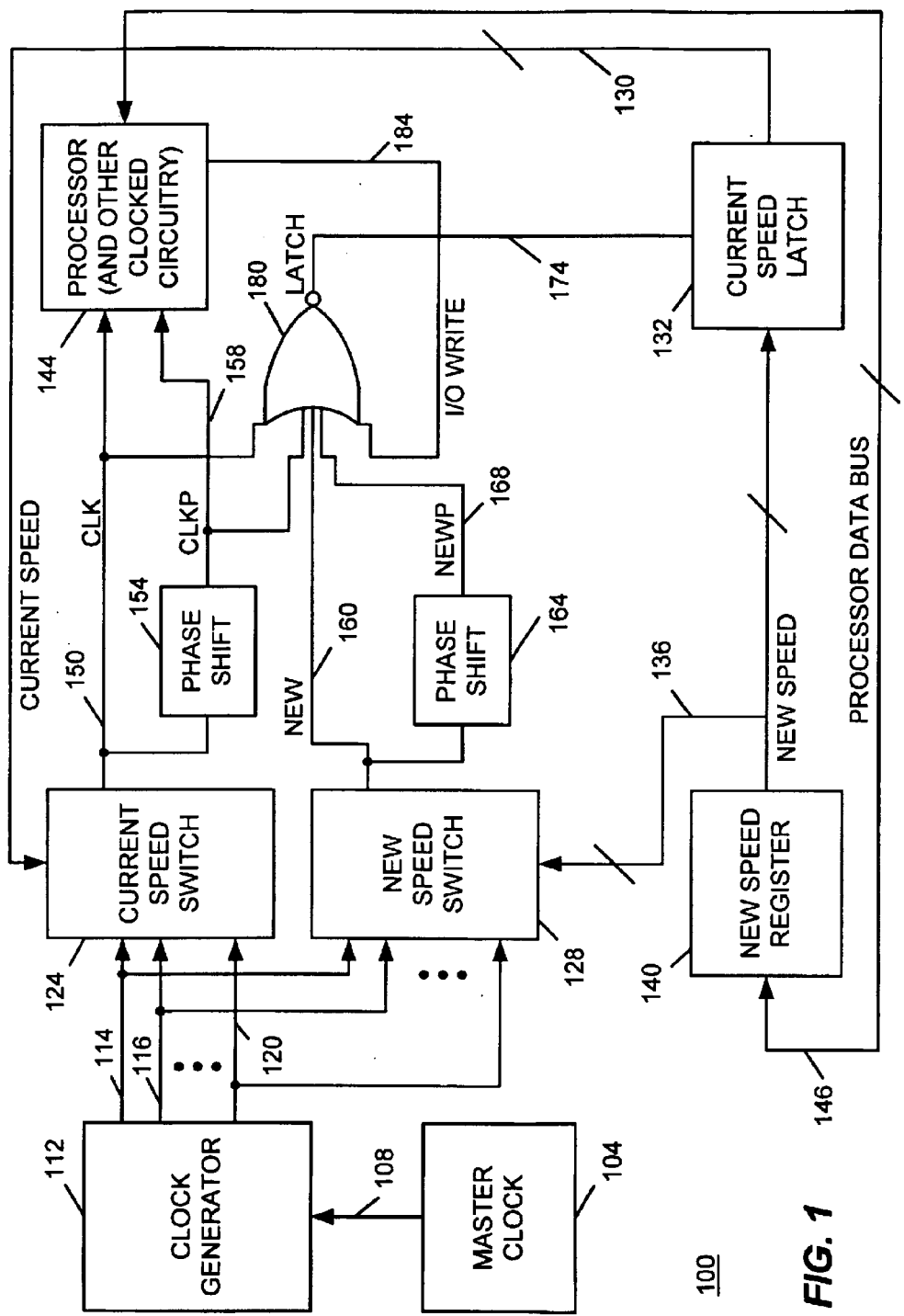
FIG. 1 is a circuit block diagram of a clock change circuit consistent with an embodiment of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "storing" or "issuing" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Circuit for Allowing a Microprocessor to Change its Operating Frequency on-the-fly in Accordance with the Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1, a circuit 100 for effecting the processor controlled clock speed manipulation of certain embodiments of the present invention is illustrated. A master clock 104, such as a crystal oscillator or other oscillator, provides a master clock signal 108 to a clock generator circuit 112. The clock generator circuit 112 produces a plurality of clock signals 114, 116 through 120 as illustrated. This can be readily accomplished using a series of flip flops with an output of the flip flops being tapped to provide each of the available clock signals at lines 114, 116 through 120. In certain preferred embodiments, eight such signals are provided with eight varying frequencies. The dock signals 114, 116 through 120 are provided to a current speed switch 124 and to a new speed switch 128. The current speed switch selects one of the input clock signals 114, 116 through 120 as its output under control of a current speed signal 130. The current speed signal 130 is retained in a latch, referred to herein as current speed latch 132. The current speed latch 132 is a three bit latch in accordance with the current invention to provide for a three bit signal 130 that can select one of the eight input clock signals 114, 116 through 120, but of course this is not to be limiting since the size of the latch and the number of generated clock frequencies can be readily varied by those skilled in the art.

The new speed switch 128 also selects one of the input clock signals 114, 116 through 120 as an output thereof under control of a new speed signal 136. The new speed signal 136 is stored in a new speed register 140 under the direction of the microcontroller's processor 144. Again, in the preferred embodiment of eight clock signals, a three bit new speed control signal 136 is used and is stored in a three bit new speed register 140. The new speed register 140 stores a clock speed select signal generated by the processor 144 of the microcontroller and communicated to the new speed register 140 over the processor data bus 146. The selected current speed at switch 124 is provided as an output at 150 to clock the processor 144 and any other circuitry that needs to be driven by this clock signal. The clock signal 150 is also applied to a phase shifter circuit 154, which in the preferred embodiment may simply be a fixed delay, to produce a phase shifted version of the current clock at 158. The signal for the current clock is designated CLK appearing at 150 and the phase shifted clock at 158 is designated CLKP. In a similar manner, under direction of the new speed signal 136, new speed switch 128 selects one of the input clocks 114, 116 through 120 as an output at 160 which is designated to be signal NEW. The signal NEW at 160 is also applied to a phase shifter at 164, which in the current embodiment may also be a simple fixed delay, to produce the signal at 168 designated NEWP which is a phase shifted version of the new clock.

The new speed signal at 136 is also applied as an input to the current speed latch 132. However, the new speed is only latched into the current speed latch 132, thereby changing the current speed produced by current speed switch 124, as a result of receipt of a latch signal at 174 produced by a logic circuit. In the preferred embodiment, the logic circuit comprises a simple five input NOR gate 180 that receives the clock signals CLK, CLKP, NEW and NEWP as well as an 110 write signal produced by the processor 144.

The NOR gate implementation 180 of the present invention should not be considered limiting since other logic configurations can also be used. However, the NOR gate 180 is a very simple implementation for the present invention occupying very small amounts of the microcontroller's die area. The I/O write signal 184 from processor 144 is a normally low logic state in this embodiment, but the processor toggles to a logic high state briefly and then returns to the low state to indicate that the frequency change should be carried out. At a time just prior to (or simultaneous with) generating the low going transition of the I/O write signal 184, the processor 144 stores the new clock speed in new speed register 140 via the processor data bus 146 and the new speed is directed to the new speed switch 128 by new speed signal 136.

Thus, at the time of the I/O write signal, the logic gate 180 is receiving both of the current clocks as well as both of the proposed new clocks. In the current implementation, once the I/O write signal returns to a logical low state, a latch signal 174, latching the new speed into the current speed latch 132, is produced the next time all four of the clock signals (CLK, CLKP, NEW and NEWP) are at a logic low level. At this point, the low going transition of latch signal 174 causes the current speed latch 132 to accept the new speed signal 136 as its stored value produced at 130.

Figure 2:
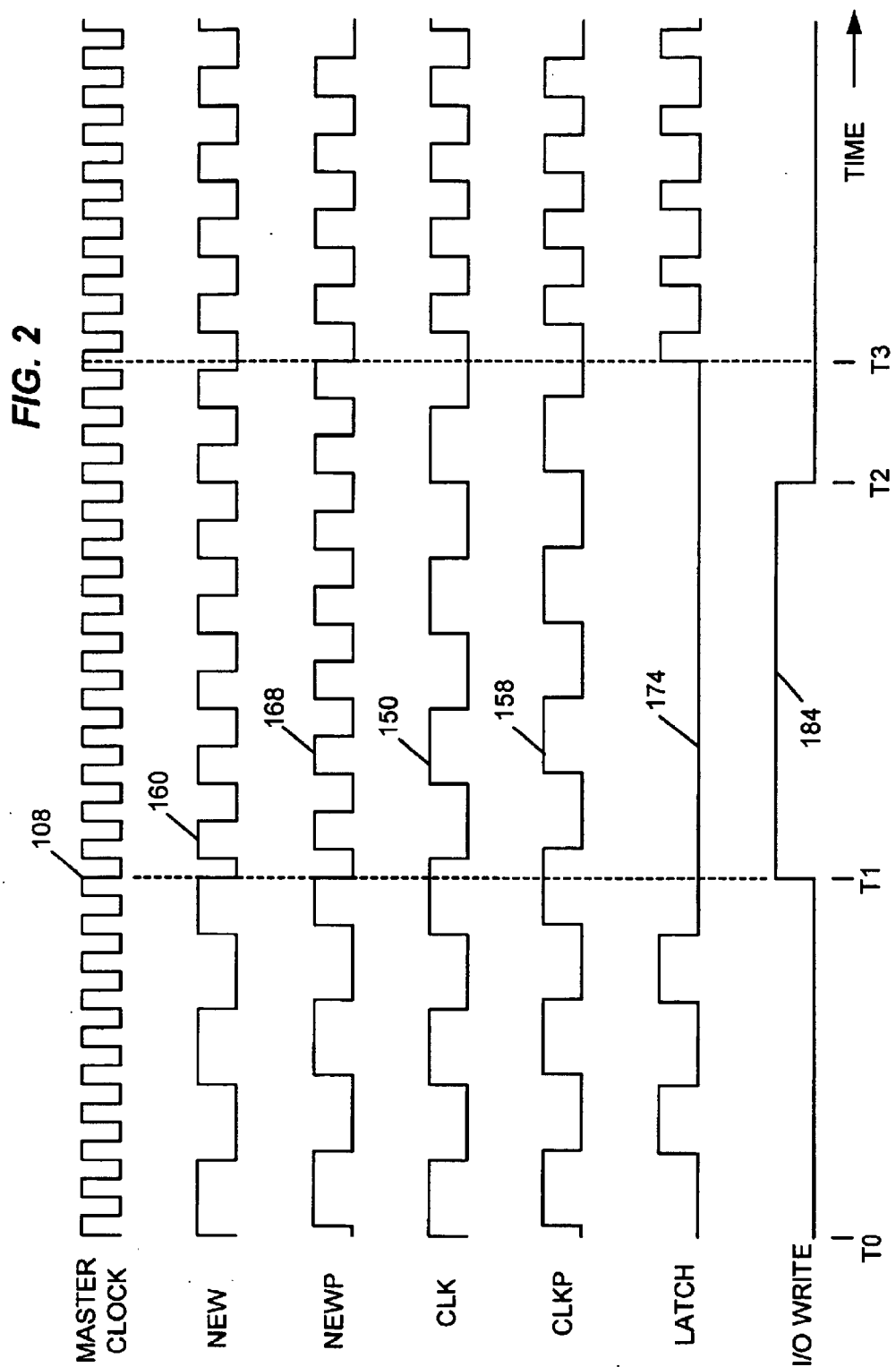
FIG. 2 is a timing diagram illustrating the operation of the circuit of FIG. 1.

Referring now to FIG. 2, a timing diagram illustrates the events leading to a change in clock speed in one embodiment. The master clock 108 is shown at the top for reference. The new clock signal NEW at 160 and phase shifted new clock signal NEWP at 168 differ by only a small delay in the new clock signal 168. At time T0 both the new clock signals NEW and NEWP and the current clock signals CLK and CLKP are being produced at the output of switches 128 and 124 and phase shifters 164 and 154. At this time, as a result of any previous clock speed change or because it is the initial clock speed, CLK is the same as NEW and CLKP is the same as NEWP. At time T1, the I/O write signal toggles from its normal logic low state to a logic high state in preparation for a frequency change. In this embodiment, the time T1 should be at approximately the same time as the selection of a new speed at new speed register 140 and new speed switch 128, but this is not to be limiting as long as all four clocks are present at the NOR gate 180 at time T2. At T1, it should be noted, it is possible for the signals NEW and NEWP to "glitch" as shown since a new clock signal is being switched at switch 128.

However, no such transition is occurring at switch 124 as evidenced by no change in the signals CLK and CLKP at time T1.

At time T2, the transition from logic high to logic low of the I/O write signal enables the logic gate 180 to make an output transition to latch the new speed into the current speed latch 132 as soon as all of the input signals are at a logic low as shown by latch signal 174. Once this occurs, signals NEW and CLK are set equal as are signals NEWP and CLKP as shown at time T3 and beyond. It is noted that at times subsequent to time T3, the latch signal 174 periodically pulses in this embodiment whenever all of the input signals to logic gate 180 are at a logic low. However, at this time, the new speed signal 136 is equal to the current speed signal at 130 and no transition or glitching of the clocks occurs.

Figure 3:
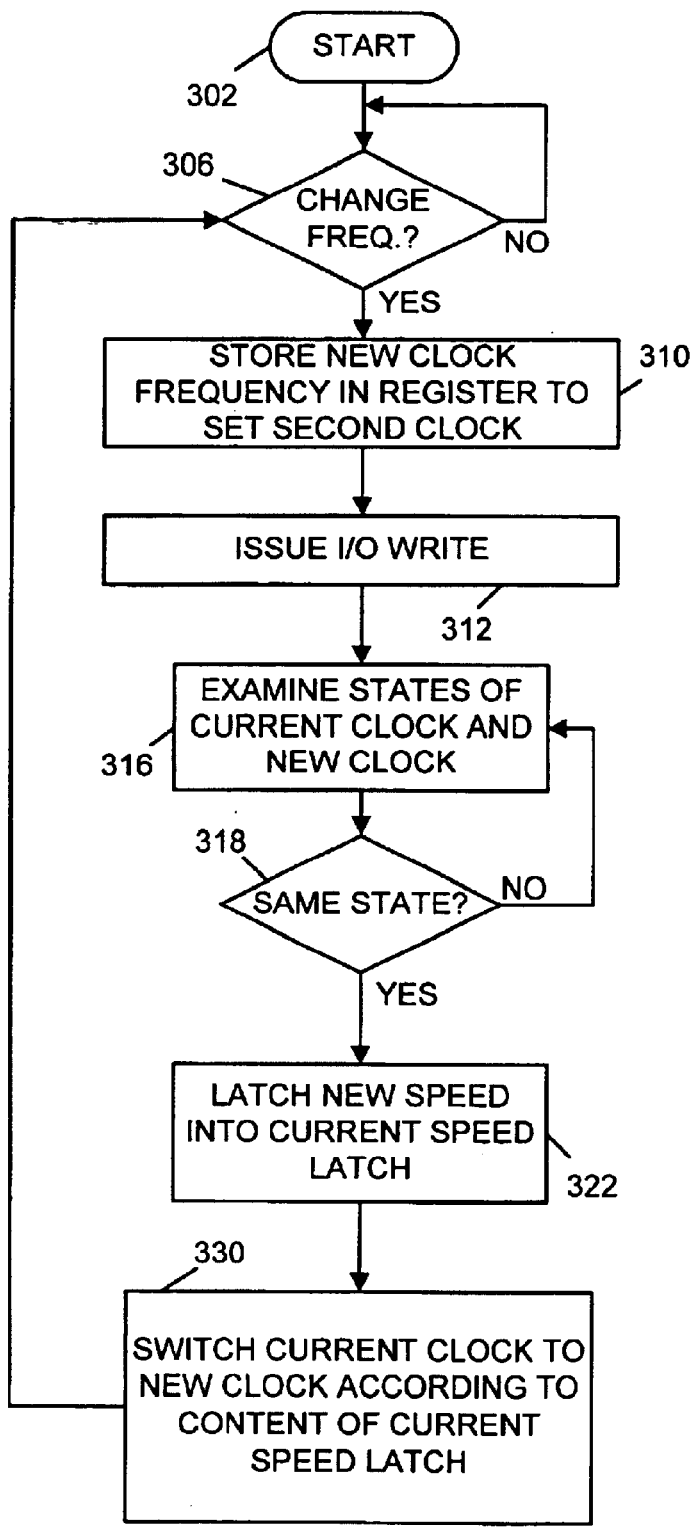
FIG. 3 is a flow chart of a process consistent with an embodiment of the present invention.

The process just described can be described as a process in accordance with the flow chart of FIG. 3 as process 300 starting at 302. If a frequency change is to occur at 306, the new clock frequency is stored in the new speed register 140 to set the value of the new speed at switch 128 at 310. The various states of the current clock and the new clock and their phase shifted versions are examined at 312 until the appropriate states of the clocks coincide at 318. Once this occurs, the new speed is latched into the current speed latch at 322 and the current clock is switched to the new clock according to the contents of the current speed latch at 330. The process then returns to 306 until the next frequency change.

Those skilled in the art will appreciate many variations are possible for the present invention. For example, although the present embodiment utilizes a simple NOR gate 180 as the decision making logic that initiates the speed change, in many embodiments it is only required that the signals CLK and NEW be equal as well as the signals CLKP and NEWP be equal for the transition to occur without producing glitches and the like. In some embodiments, the there may be an advantage in the logic circuit detecting either high or low logic states, and those skilled in the art can readily adapt the current design to this preference without departing from the invention.

Figure 4:
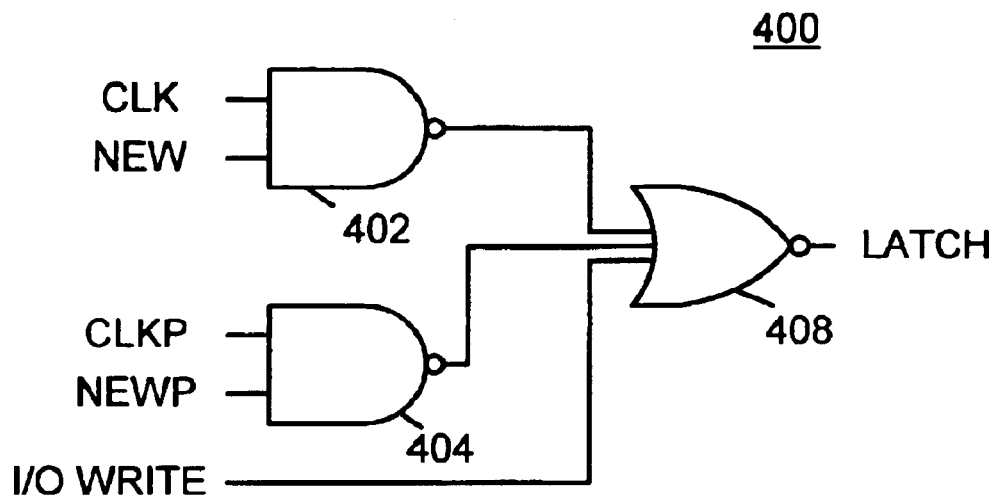
FIG. 4 is a circuit diagram of an alternative logic circuit arrangement for an embodiment of the present invention.

FIG. 4, illustrates a circuit that can be used to detect a condition of all clock signals being at a logic high and equal, with the I/O write signal being essentially the same as the previous embodiment. This circuit can generally be used instead of the NOR gate 180 if detection of logic high levels is desirable. In this embodiment, the signals NEW and CLK are compared at a NAND gate 402 while NEWP and CLKP are compared at NAND gate 404. The output of gates 402 and 404 are applied along with the I/O write signal to a NOR gate 408 the output of which produces the latch signal. It is noted that the circuit arrangement 400 of FIG. 4 may produce a change in clock frequency at a different time than in the previous example, that is, when all of the signals are at a logic high state rather than a logic low state, but in general this is of little consequence. Those skilled in the art will appreciate that many other logic arrangements are possible to implement the clock change of the present invention without departing from the present invention. In another embodiment having similar results, a single four input NAND gate can substitute for the two NAND gates 402 and 404. Similarly, by substitution of an AND gate for NOR gate 408, an I/O write signal of inverted polarity could be used.

Figure 5:
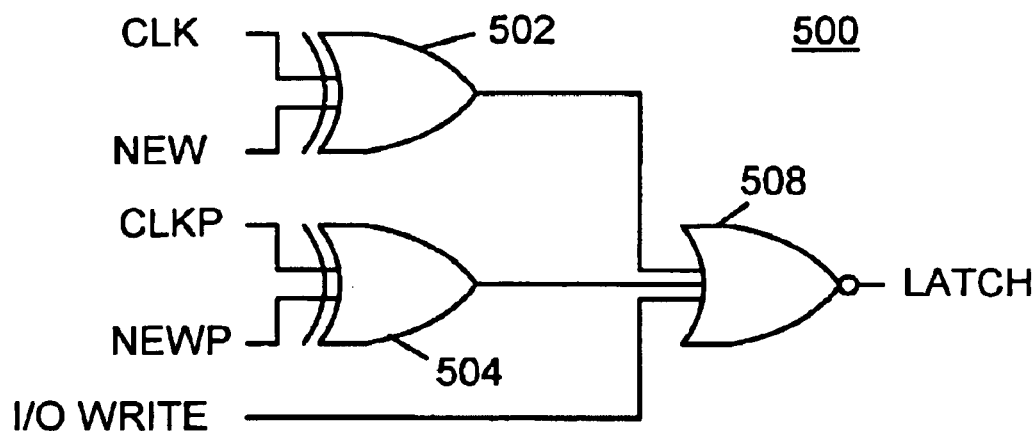
FIG. 5 is another circuit diagram of another alternative logic circuit arrangement for another embodiment of the present invention.

Referring now to FIG. 5, another embodiment of a logic circuit suitable for replacing NOR gate 180 is illustrated in which exclusive OR gates 502 and 504 respectively receive signals CLK and NEW at gate 502 and CLKP and NEWP at gate 504. Their outputs are again combined with the I/O write signal at NOR gate 508 to produce the latch signal as an output. In the embodiment shown as circuit 500 at FIG. 5, whenever the signal CLK and NEW are equal and the signal CLKP and NEWP are equal and the I/O write signal is low, the latch signal is produced. Thus, the circuit of FIG. 5, will institute a change in the frequency if, for example, the two clock signals CLK and NEW are high while the phase shifted clock signals CLKP and NEWP are low (but equal). Similarly, if signals CLK and NEW are low and signals CLKP and NEWP are high the latch signal can be generated. In this example the only requirement for generating the latch signal imposed upon the clock signals is that the clock signals are equal and the phase shifted clock signals are equal. Many other variations of circuits to accomplish similar functions will occur to those skilled in the art without departing from the present invention.

In accordance with the preferred embodiment, the master clock may be a 24 or 48 MHz clock and the phase shift may be accomplished by a fixed delay of approximately 21 nanoseconds. However, this is not to be considered limiting since variable or proportional delays could also be used. Since the I/O write signal 184 and the clock speed select signal sent over bus 146 originate at the processor, the operational speed of the processor 144 can be adjusted under program control based on whatever conditions can be programmed into the microcontroller's processor 144. Moreover, the present arrangement occupies very little area on the microcontroller die and provides a simple solution to the problem of changing clock speeds.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A circuit that allows a processor forming a part of a microcontroller to change its operating frequency, comprising:

a clock generator generating a plurality of clock signals at a plurality of frequencies;

a first switch receiving the plurality of clock signals and selecting one of the clock signals as an output thereof to be the current clock according to a current speed select signal;

a current speed latch storing the current speed select signal;

a first phase shifter shifting the phase of the current clock to produce a phase shifted current clock;

a second switch receiving the plurality of clock signals and selecting one of the clock signals as an output thereof to be the new clock according to a new speed select signal;

a new speed register storing the new speed select signal; wherein, the new speed select signal is produced by the processor and stored in the new speed register;

a second phase shifter shifting the phase of the new clock to produce a phase shifted new clock; and logic means, receiving the current clock, the phase shifted current clock, the new clock, the phase shifted new clock and a signal from the processor directing a speed change as inputs thereto, the logic means for producing a signal latching the new speed into the current speed latch at a point in time after the speed change signal when the current clock, phase shifted current clock, the new clock and the phase shifted new clock have the same state.

2. The circuit according to claim 1, wherein the first and second phase shifter comprise a fixed delay circuit.

3. The circuit according to claim 1, wherein the first and second phase shifter comprise a fixed delay circuit producing a fixed delay of approximately 21 microseconds.

4. The circuit according to claim 1, wherein the logic means comprises a logic NOR gate.

5. The circuit according to claim 1, wherein the speed change signal comprises an I/O write signal.

6. The circuit according to claim 1, wherein the plurality of clock signals are generated by dividing a master clock using a series of flip-flops.

7. A circuit that allows a processor forming a part of a microcontroller to change its operating frequency, comprising:

a clock generator generating a plurality of clock signals at a plurality of frequencies;

a first switch receiving the plurality of clock signals and selecting one of the clock signals as an output thereof to be the current clock according to a current speed select signal;

a current speed latch storing the current speed select signal;

a first phase shifter shifting the phase of the current clock to produce a phase shifted current clock;

a second switch receiving the plurality of clock signals and selecting one of the clock signals as an output thereof to be the new clock according to a new speed select signal;

a new speed register storing the new speed select signal;

wherein, the new speed select signal is produced by the processor and stored in the new speed register;

a second phase shifter shifting the phase of the new clock to produce a phase shifted new clock;

logic means, receiving the current clock, the phase shifted current clock, the new clock, the phase shifted new clock and a signal from the processor directing a speed change as inputs thereto; and the logic means producing a latching signal latching the new speed into the current speed latch at a point in time after the speed change signal when the current clock has the same state as the new clock, and when the phase shifted current clock has the same state as the phase shifted new clock.

8. The circuit according to claim 7, wherein the first and second phase shifter comprise a fixed delay circuit.

9. The circuit according to claim 7, wherein the first and second phase shifter comprise a fixed delay circuit producing a fixed delay of approximately 21 microseconds.

10. The circuit according to claim 7, wherein the logic means comprises a logic NOR gate, and wherein the logic means for producing a signal latching the new speed into the current speed latch at a point in time after the speed change signal when the current clock has the same state as the new clock, the phase shifted current clock and the phase shifted new clock.

11. The circuit according to claim 7, wherein the logic means comprises a first EXOR gate receiving the current clock and the new clock and a second EXOR gate receiving the phase shifted current clock and the phase shifted new clock, and wherein the first and second EXOR gates have outputs connected to two inputs of a NOR gate with the speed change signal connected to a third input of the NOR gate and with an output of the NOR gate producing the latching signal.

12. The circuit according to claim 7, wherein the logic means comprises a first NAND gate receiving the current clock and the new clock and a second NAND gate receiving the phase shifted current clock and the phase shifted new clock, and wherein the first and second NAND gates have outputs connected to two inputs of a NOR gate with the speed change signal connected to a third input of the NOR gate and with an output of the NOR gate producing the latching signal.

13. The circuit according to claim 7, wherein the plurality of clock signals are generated by dividing a master clock using a series of flip-flops.

14. A circuit that allows a processor forming a part of a microcontroller to change its operating frequency, comprising:

a master clock generating a master clock signal;

a clock generator generating a plurality of clock signals from the master clock signal at a plurality of frequencies by dividing the master clock signal using a plurality of series connected flip flops;

a first switch receiving the plurality of clock signals and selecting one of the clock signals as an output thereof to be the current clock according to a current speed select signal;

a current speed latch storing the current speed select signal, a first phase shifter shifting the phase of the current clock to produce a phase shifted current clock by delaying the current clock by a fixed delay;

a second switch receiving the plurality of clock signals and selecting one of the clock signals as an output thereof to be the new clock according to a new speed select signal;

a new speed register storing the new speed select signal;

wherein, the new speed select signal is produced by the processor and stored in the new speed register;

a second phase shifter shifting the phase of the new clock to produce a phase shifted new clock by delaying the new clock by a fixed delay; and a logic NOR gate, receiving as inputs the current clock, the phase shifted current clock, the new clock, the phase shifted new clock and a signal from the processor directing a speed change as inputs thereto, the NOR gate producing a signal latching the new speed into the current speed latch at a point in time when speed change signal, the current clock, phase shifted current clock, the new clock and, the phase shifted new clock have the same state.

15. The circuit according to claim 14, wherein the first and second phase shifter comprise a fixed delay circuit producing a fixed delay of approximately 21 microseconds.

16. A method for a processor forming a part of a microcontroller to change its clock frequency, comprising:

at the processor, receiving a clock signal;

determining that the clock frequency is to be changed under program control;

storing a new clock frequency signal in a new speed register;

issuing an I/O write command indicating that the clock frequency is to change;

in a logic circuit, examining a current clock signal, a new clock signal, a phase shifted current clock signal and a phase shifted new clock signal;

when the current clock signal, the new clock signal, the phase shifted current clock signal and the phase shifted new clock signal reach predetermined states, latching the new clock frequency signal into a current clock speed latch; and at a switch, receiving an output from the current clock speed latch and changing a switch setting in response thereto, the switch setting determining the speed of the clock signal.

17. The method according to claim 16, further comprising providing the new clock signal and the phase shifted new clock signal to the logic circuit through a switch.

18. The method according to claim 16, wherein the switch receives a plurality of clock signals produced from a master clock signal.

19. The method according to claim 16, wherein the phase shifted current clock and the phase shifted new clock are delayed versions of the current clock and the new clock respectively, with the delay being a fixed constant delay.

20. The method according to claim 16, wherein the logic circuit examines the current clock signal, the new clock signal, the phase shifted current clock signal and the phase shifted new clock signal to determine that at least the current clock signal has the same state as the new clock signal and the phase shifted current clock signal has the same state as the phase shifted new clock signal.

* * * * *